United States Patent
Dasilva et al.

(10) Patent No.: US 6,877,522 B2
(45) Date of Patent: Apr. 12, 2005

(54) FUEL TANK ASSEMBLY

(75) Inventors: Antonio J. Dasilva, Middletown, CT (US); Daniel A. Gilmour, West Hartford, CT (US); Wayne A. Ley, Middletown, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 216 days.

(21) Appl. No.: 10/294,870

(22) Filed: Nov. 14, 2002

(65) Prior Publication Data

US 2003/0102033 A1 Jun. 5, 2003

Related U.S. Application Data

(63) Continuation-in-part of application No. 09/997,907, filed on Nov. 30, 2001, now abandoned.

(51) Int. Cl.$^7$ ............................................... F02M 37/10

(52) U.S. Cl. .............................. 137/15.01; 137/565.34; 123/509

(58) Field of Search ...................... 137/565.34, 565.17, 137/565.01, 15.01; 123/509

(56) References Cited

U.S. PATENT DOCUMENTS

| | | | | |
|---|---|---|---|---|
| 4,860,714 A | | 8/1989 | Bucci ......................... | 123/514 |
| 5,988,213 A | * | 11/1999 | Yoshioka ..................... | 137/590 |
| 5,992,394 A | * | 11/1999 | Mukaidani et al. ......... | 123/509 |
| 6,000,913 A | * | 12/1999 | Chung et al. ............... | 123/509 |
| 6,230,690 B1 | * | 5/2001 | Umetsu ...................... | 123/509 |

* cited by examiner

Primary Examiner—Kevin Lee
(74) Attorney, Agent, or Firm—Reising, Ethington, Barnes, Kisselle, P.C.

(57) ABSTRACT

This invention provides a low profile fuel tank assembly having an elongated fuel delivery module mounted horizontally within the fuel tank and independent from a flange which covers a sole fuel tank access hole. An integrated fuel pump and associated motor of the module dictates the length of the module. The motor and pump has a rotational axis preferably disposed substantially horizontal within the fuel tank. Because the fuel delivery module is supported by the fuel tank shell or bottom, independent of the flange, the access hole can be located anywhere on the fuel tank in order to simplify fuel tank ingress and minimize repair procedures. During assembly, the module is inserted into the fuel tank through the access hole, and is then placed and snap-locked preferably into a bracket structure permanently engaged to an inside surface of the fuel tank.

45 Claims, 8 Drawing Sheets

FUEL TANK ASSEMBLY

REFERENCE TO RELATED APPLICATION

This is a continuation-in-part application of U.S. patent application Ser. No. 09/997,907,filed Nov. 30, 2001 now abandoned.

FIELD OF THE INVENTION

This invention relates to a fuel tank assembly and more particularly to a fuel tank assembly having a low profile fuel delivery module.

BACKGROUND OF THE INVENTION

Traditionally, fuel tank assemblies have a fuel tank with an access hole covered by a flange. An elongated fuel delivery module is carried by and projects downward from the flange, stopping just short of or bearing on the fuel tank bottom. The overall length of the module is generally dictated by an electrical motor and fuel pump disposed in series along a vertical rotational axis. The vertical module length dictates the depth or minimum vertical height of the fuel tank or reservoir. Therefore, the optimum profile of the fuel tank is limited by the vertical length of the fuel delivery module. And, to optimize the already restricted profile, the tank access hole must be located on an upper horizontal surface, and most probably, the highest elevated surface of the fuel tank.

Locating the access hole on top of the tank is seldom the preferred location for maintenance purposes since the tank must be removed from the vehicle prior to accessing the internal components of the fuel tank assembly through the access hole. Because the fuel delivery module is cantilevered from the flange, the flange and the interconnection to the fuel tank itself must be robust and designed so as to pass high speed vehicle crash tests which create high torque or torsional forces upon the flange. The larger the flange, the more likely the flange seal will fail. Unfortunately, much of the available flange surface area is occupied by the fuel delivery module so that use of the flange surface area for other component mountings, or penetrations into the fuel tank, is limited.

SUMMARY OF THE INVENTION

This invention provides a low profile fuel tank assembly having a preferably elongated fuel delivery module mounted generally horizontally within the fuel tank independent of a flange which covers a sole fuel tank access hole. An integrated fuel pump and associated electric motor of the module has a rotational axis preferably disposed substantially horizontal within the fuel tank. Because the fuel delivery module is supported by the fuel tank shell or bottom, independent of the flange, the access hole can be located anywhere on the fuel tank in order to simplify fuel tank ingress and minimize repair procedures. During assembly, the module is preferably inserted into the fuel tank through the access hole, and is then secured to a bracket or strap assembly attached to the inside surface of the fuel tank, preferably via laser welding.

Preferably, the fuel delivery module is inserted into the bracket directly adjacent to a base plate of the bracket secured to the inner bottom of the tank. During assembly, the fuel delivery module is centered laterally upon the base plate of the bracket by two opposing sides projecting upward from the base plate. The module is preferably also centered longitudinally upon the base plate by two pairs of opposing stop tabs projecting upward from end edges of the base plate.

In a first embodiment of the bracket, the fuel delivery module engages the bracket by sliding horizontally along interlocking rails formed on both sides of the module and into the mounting bracket between a clasp of the bracket and a support structure of the module. Preferably, a forward tab of the bracket prevents the module from sliding too far forward. The module snap locks in place with the bracket, preventing rearward movement and disengagement, via an upward projecting locking tab of the bracket and a forward projecting snap clip of the support structure which resiliently engages the locking tab.

In a second embodiment of the bracket, the base plate is part of a resilient tray which engages at least one resilient strap at both ends of the strap. The bracket is designed to reduce shear forces placed upon the welds between the tank and the base plate during impact scenarios. To do this, the fuel delivery module is encircled by the tray and the strap. The strap is in tension when extended over and engaged directly to the fuel delivery module and a clearance exists between the module and the sides or curbs of the tray permitting some movement of the module with respect to the bracket.

Objects, features and advantages of this invention include providing a low profile fuel tank assembly thereby reducing surrounding design restraints of a vehicle fuel tank and the vehicle using it, simplifying fuel system maintenance procedures by enabling easier fuel tank ingress, reducing flange size to improve sealing, freeing up flange surface area for additional component penetrations into the fuel tank, and reducing fuel permeation while providing a relatively simple, design and a low cost rugged, durable, and reliable fuel delivery module and tank assembly.

DESCRIPTION OF THE DRAWINGS

These and other objects, features and advantages of this invention will be apparent from the following detailed description, appended claims, and accompanying drawings in which:

DETAILED DESCRIPTION OF THE PREFERRED EMBODIMENTS

Figure 1:
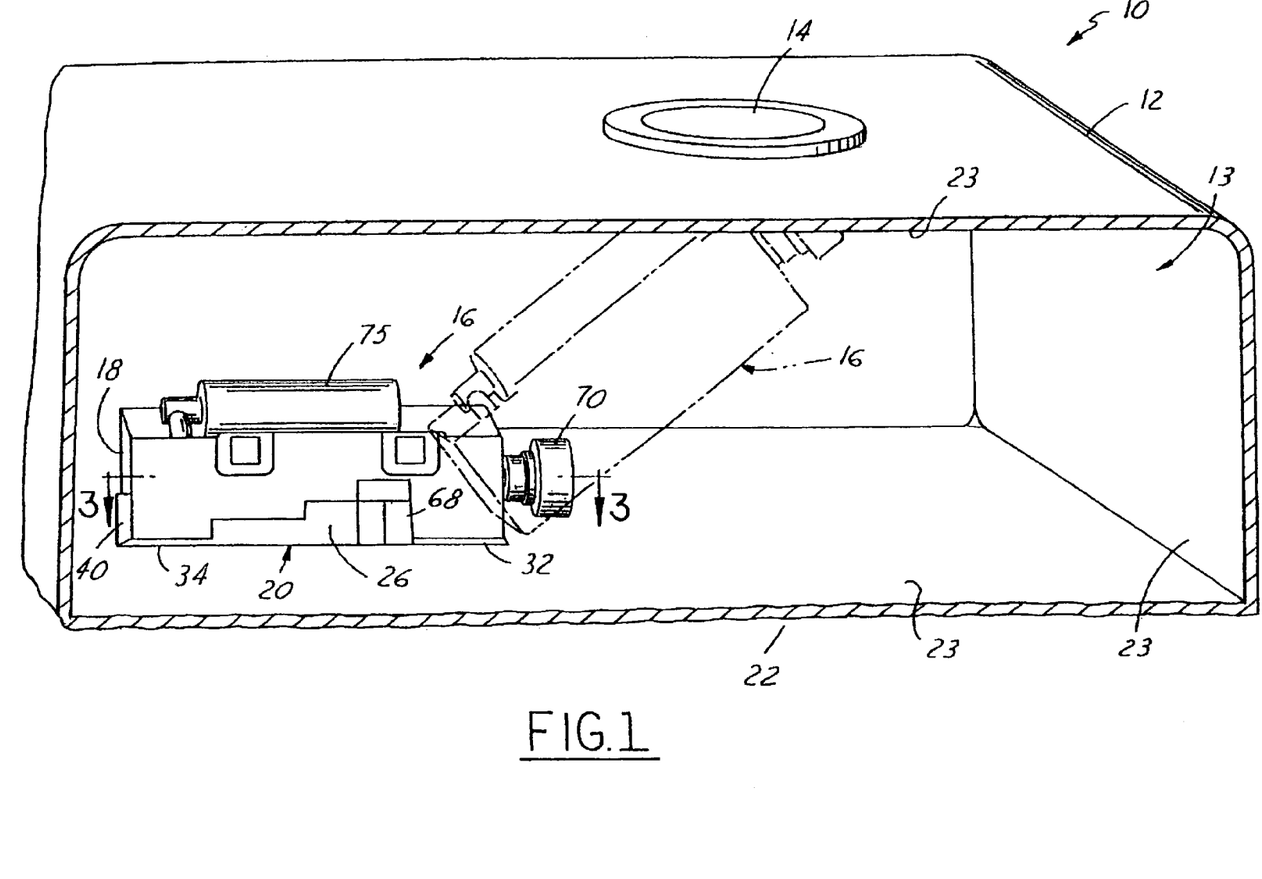
FIG. 1 is a perspective view of a fuel delivery module and tank assembly with part of the fuel tank broken away and in section to show internal detail.
Figure 2:
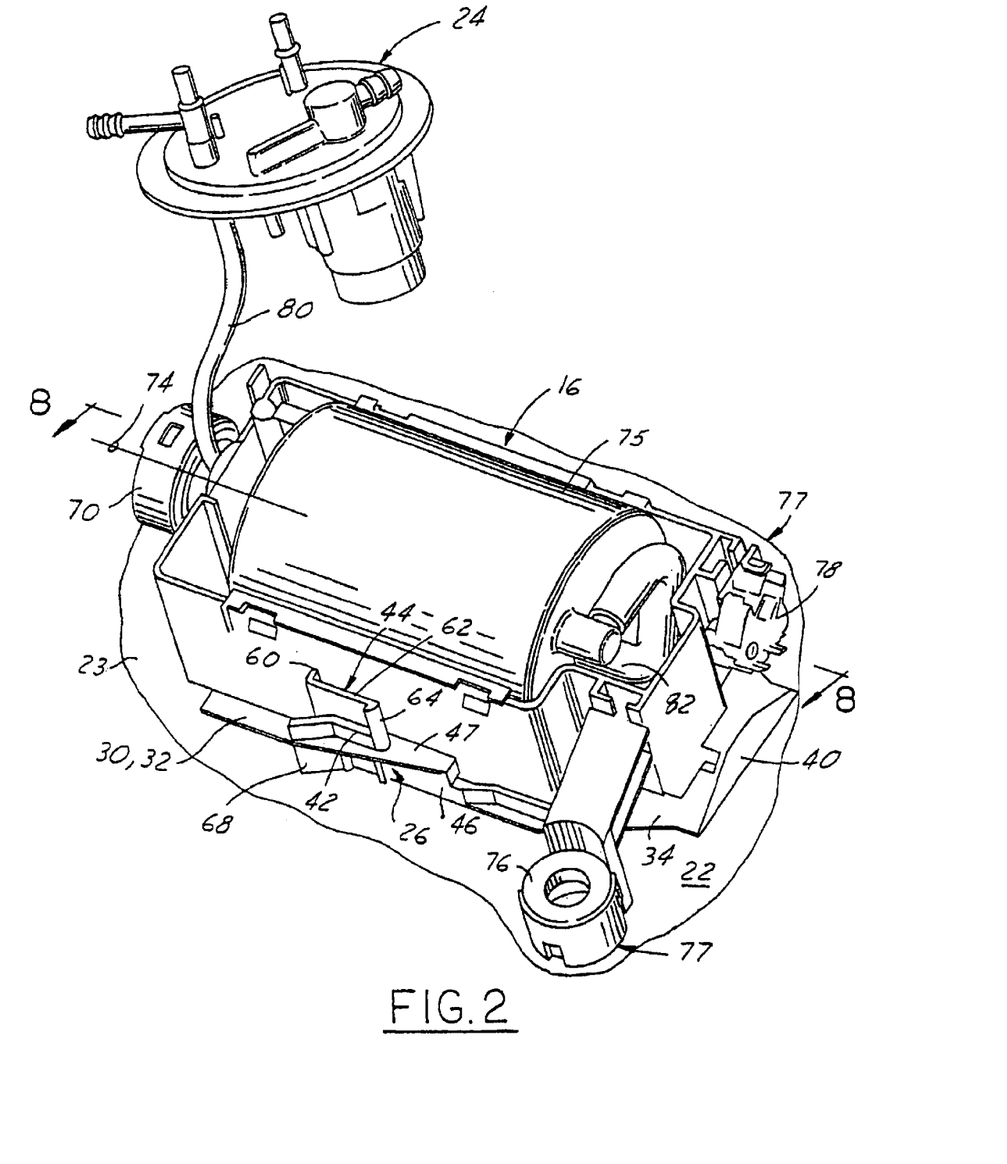
FIG. 2 is a perspective view of a fuel delivery module, mounting bracket and a flange of the assembly of FIG. 1.

Referring in more detail to the drawings, FIG. 1 illustrates a fuel tank assembly 10 having a fuel tank 12 with an access hole 14, being large enough, so that an elongated fuel delivery module 16 can be inserted into a fuel chamber 13 defined by the fuel tank 12. A leading end 18 of the module 16 is positioned in front of a receiving end of an elongated bracket 20 welded to a bottom surface or wall 22 of an inner surface 23 of the fuel tank 12. The bracket 20 and module 16 can be located on any other inner surface of the fuel tank 12; however, positioning the module on the bottom surface eliminates the need for a pump inlet tube which could contribute toward fuel vapor lock. Also, because the longitude of the module 16 is horizontal the shape of the fuel tank 12 is enabled to have a low profile, not otherwise available. The fuel tank 12 is preferably made of a blow molded plastic or high density polyethylene, HDPE, and the bracket 20 is made of an injected plastic or HDPE. Being of substantially like material, the plastic bracket 20 is welded to the inner surface 23 of the bottom wall 22, likewise, in a substantially horizontal position. The access hole 14 is covered and sealed or closed by a flange 24 as best shown in FIG. 2.

Traditionally, the access hole 14 is positioned at the upper most part of the fuel tank 12 because the fuel delivery module is commonly mounted in a vertical direction and carried by the flange. Since the fuel delivery module 16 of the present invention is not carried by the flange 24, the access hole 14 can be located any where on the fuel tank 12. In fact, the access hole 14 can easily be located through any side of the fuel tank 12. Such positioning options are desirable to facilitate fuel tank assembly, maintenance and repair. Aside from the vertical mounting and flange support of traditional assemblies, the module 16 of the present invention can be identical to the fuel pump assembly described in Bucci et al., U.S. Pat. No. 4,860,714 and incorporated herein by reference.

Referring to FIGS. 2–5, in assembly, the fuel delivery module 16 is slidably received between opposing clasps 26 which project upward from a substantially planar base plate 30 of the bracket 20 and into the fuel chamber 13 defined by the fuel tank 12. The base plate 30 is welded, embedded, or otherwise attached to the substantially horizontal bottom wall 22 of the fuel tank 12 and extends from a forward portion 34 to a rearward portion 32. When utilizing HDPE fuel tank shells having multi-layers with an intermediate fuel permeation barrier layer, not shown, it is preferable not to breach the permeation barrier layer when securing the bracket 20 to the fuel tank 12. Therefore, welding to the bottom surface 22 or inner layer of the multi-layered fuel tank is a preferred method of attachment. Another method, not shown, is to mold protrusions within the fuel tank during the tank manufacturing blow molding process. The bracket 20, or the module 16 directly, can then be press fitted to the protrusions.

Figure 4:
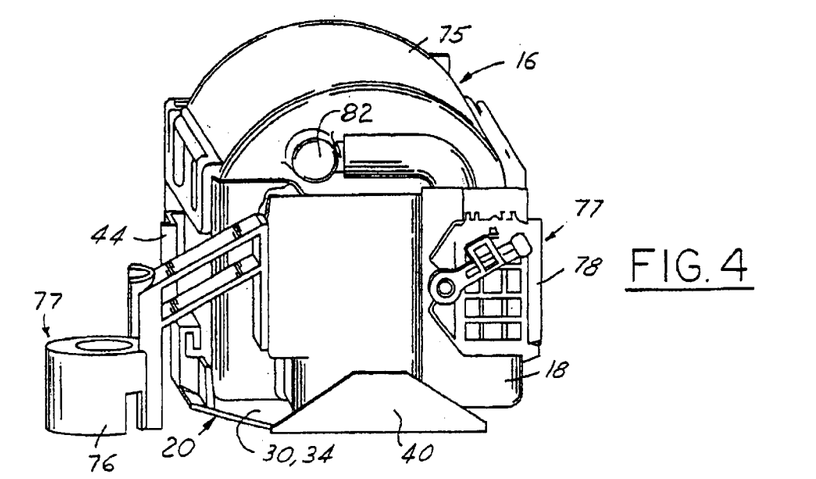
FIG. 4 is a front end perspective view of the fuel delivery module and bracket.
Figures 5, 6:
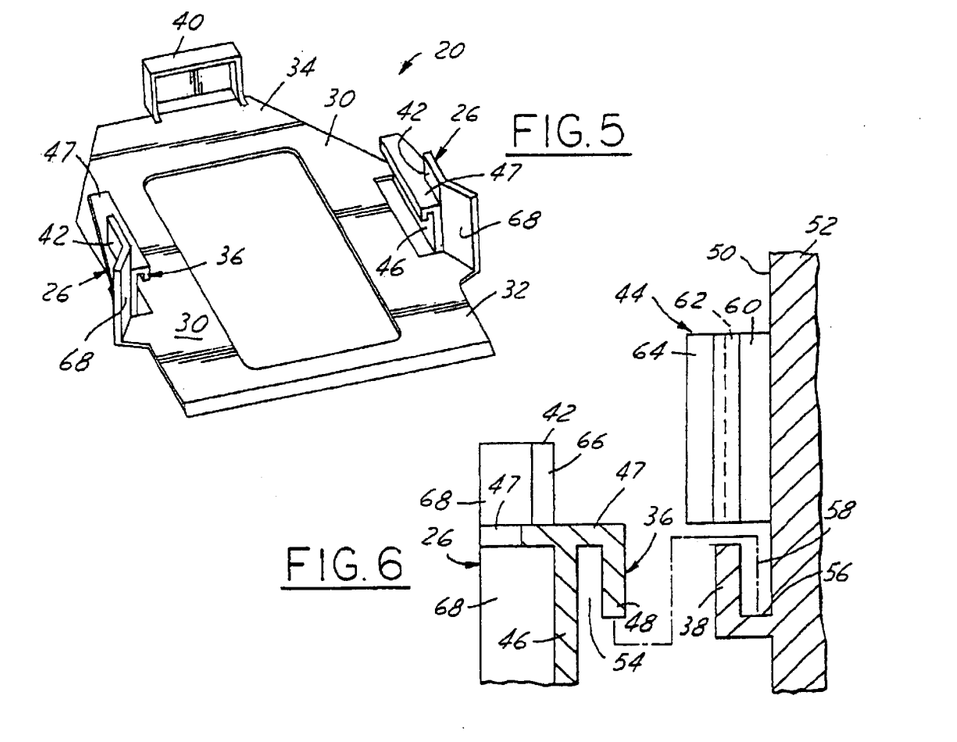
FIG. 5 is a perspective view of the bracket.
FIG. 6 is an exploded partial cross section view of the fuel delivery module and bracket taken along line 6—6 of FIG. 3.

Referring to FIGS. 4–6, when assembled, the clasps 26 prevents upward movement of the fuel delivery module 16 away from the base plate 30, via an elongated guideway 36 of each clasp 26 which slideably engages an interlocking rail 38 of the fuel delivery module 16. The guideways 36 and rails 38 extend longitudinally between the forward and rearward portions 34, 32 of the bracket 20. Preventing the module 16 from moving excessively forward and disengaging from the guideways 36 and rails 38 is a stop tab 40 projecting unitarily upward from the base plate 30 and being engageable with the leading end 18 of the fuel delivery module 16. In assembly, rearward movement of the fuel delivery module 16 with respect to the bracket 20, which could otherwise disengage the interlocking guideways and rails 36, 38 in the rearward direction, is prevented by locking tabs 42 of the bracket 20 which project upward from each clasp 26 and a pair of snap clips 44 of the fuel delivery module 16 which engage the locking tabs 42. The clasps 26 are generally somewhat flexible in order to act as bottom referencing springs which are capable of absorbing bottom impact loads placed upon the fuel tank 12.

Figure 3:
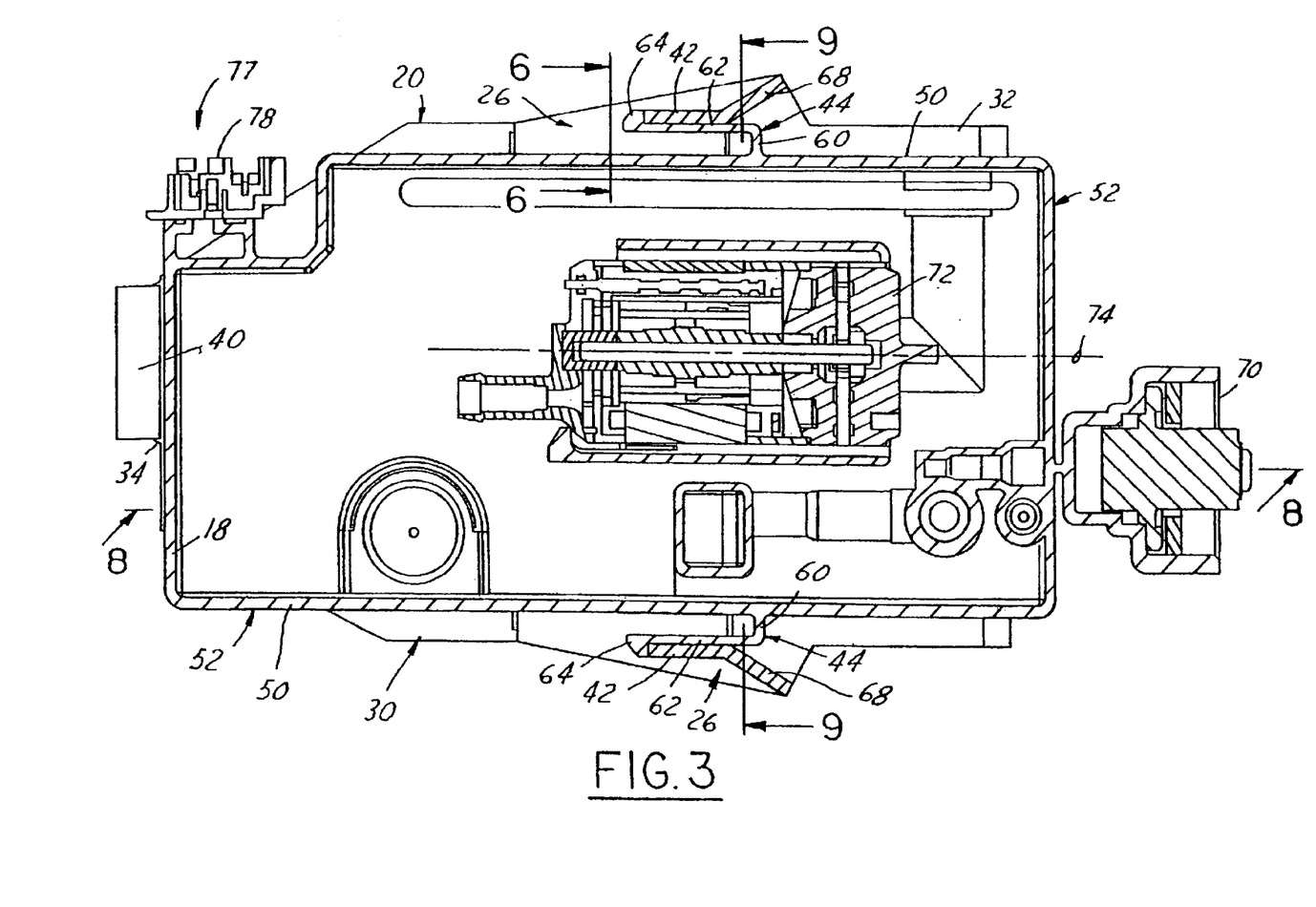
FIG. 3 is a section view of the fuel delivery module and mounting bracket taken along line 3—3 of FIG. 1.

As best illustrated in FIGS. 3, 5 and 6, the guideways 36 of each of the laterally opposed clasps 26 each have a channel 54 defined by a rail 48 extending longitudinally of the bracket and fixed at a right angle to a cross bar 47 attached to the upper edge of a substantially planar wall 46 which projects perpendicularly upward from the base plate 30 and extends longitudinally lengthwise of the bracket 20. The rail 48 projects downward toward the base plate 30 from a longitudinal extending edge of the cross bar 47 and extends parallel to the wall 46. In assembly each channel 54 receives and interlocks with one of the upward projecting rails 38 of a support structure or can 52 of the fuel delivery module 16. The rail 38 extends longitudinally, projects upward, and along its lower edge is fixed to a traverse spacer bar 56 attached to the can 52. Preferably the can has a side surface 50 which is spaced from and extends parallel to the rail 38 to define therewith a channel or slot 58 in which the rail 48 is disposed when the fuel delivery module 16 is engaged to the bracket 20.

Referring to FIGS. 3 and 6, the snap clips 44 are attached each to one of both longitudinal sides 50 of the can 52. The snap clips 44 are disposed over and are spaced vertically above the rails 38 of the can 52 so that the bar 47 of the clasp 26 on the bracket 20 can fit there-between. Each snap clip 44 has a catch or lip 64 on one end of a flexible arm 64 with its other end cantilevered and attached by a base 60 to the longitudinal side 50 of the can 52. The base 60 serves to support and space the cantilevered arm 62 laterally outward from the longitudinal side 50. The cantilevered arm 62 is disposed substantially parallel to the longitudinal side 50 and projects in a forward direction, as best shown in FIG. 2. The lip 64 projects laterally outward with respect to the arm 60 and the longitudinal side 50. As the fuel delivery module 16 slides into the bracket 20, the locking tab 42 causes the cantilevered arm 62 of the snap clip 44 to flex inward toward the longitudinal side 50 of the can 52 and the lip 64 to slide along an inner surface of the locking tab 42. The cantilevered arm 62 snaps back or unflexes when the lip 64 slides past the locking tab 42 to overlap and engage a forward facing stop surface 66 of the locking tab 42. Abutment of the lip 64 of the snap clip 44 with the stop surface 66 of the locking tab 42 prevents the fuel delivery module 16 from moving rearward and disengaging from the interlocking guideways 36 and rails 38. To permit removal of the fuel delivery module 16 from the bracket 20, a lateral inward force is applied to the arms 62 of the snap clips 44 (which extends vertically above the locking tab 42). When this disengaging lateral force is applied to both clips, the lips 64 separate from their respective locking tabs 42 permitting the fuel delivery module to slide rearwardly.

During assembly, alignment of the fuel delivery module 16 for insertion between the opposing clasps 26 is guided by angled or inclined guide plates 68 of the clasps 26. Each guide plate 68 is substantially planar, angled outward and projects rearward from both the rear vertical edge of the locking tab 42 and the rear edge of the wall 46 of its associated clasp 26. The combination of both guide plates 68 of the clasps 26 forms a type of funnel which helps to guide and align the fuel delivery module 16 between the opposing clasps 26. The bar 47 reinforces the guide plate 68 by extending rearward to and engaging a midsection of the guide plate 68.

Figure 7:
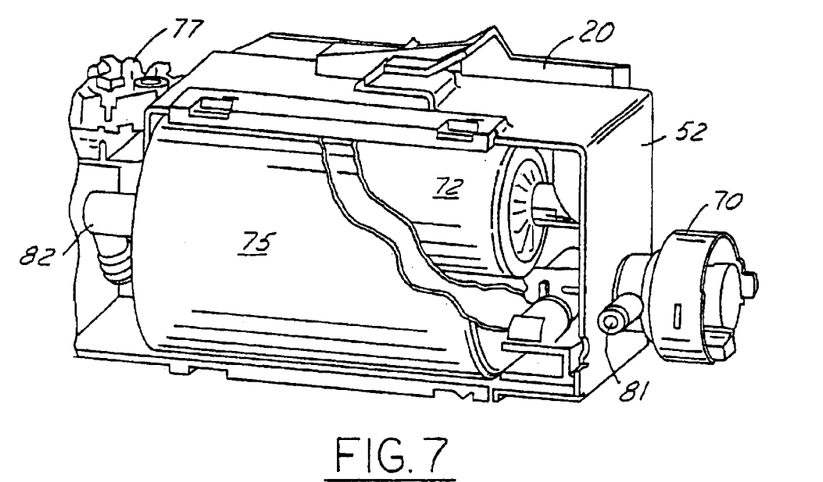
FIG. 7 is a perspective view of the fuel delivery module and bracket with part of a fuel filter broken away to show internal detail.
Figure 8:
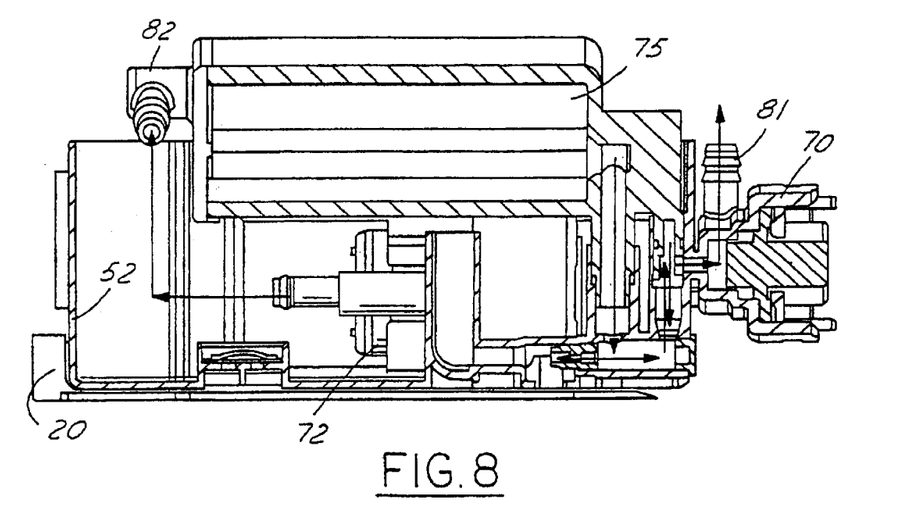
FIG. 8 is a section view of the fuel delivery module and bracket taken along line 8—8 of FIG. 2.

As further illustrated in FIGS. 7–8, the can 52 of the fuel delivery module 16 carries a fuel supply pressure control assembly 70 which is illustrated as a pressure control regulator mounted to the outlet of a fuel pump and motor 72 having a rotational axis 74 disposed substantially horizontal and preferably slanted not more than ten degrees from an imaginary horizontal plane when the fuel tank is in its normal orientation within the vehicle. However, the pressure control assembly 70 can also be a pressure transducer motor speed control system where a fuel pressure transducer feeds back to a variable speed fuel pump. An advantage of this system is that less energy is consumed since the pump does not run at full system voltage all the time as does the pressure regulator.

Fuel flows from a reservoir carried by the can 52 via the fuel pump and motor 72 disposed within the can 52. From pump 72, the fuel flows through an elongated fuel filter 75 of the module 16 and to the regulator 70, as best shown in FIG. 8. The filter 75 partially wraps about the pump and motor 72 and has a fuel inlet nozzle 82 mounted to an end of the filter 75 which is opposite or away from the regulator 70. A fuel level sensor assembly 77, which includes a pivoting float arm sensor 78 and/or a fuel piezo level sensor 76, are integral to the module 16. The pivoting float arm sensor 78 functions off a fixed ohm resistor card with variable resistance controllable by a float engaged to the distal end of a pivoting arm.

Various attachments on the module 16 lead to and extend through the flange 24. These attachments include a wiring harness (not shown) and a flexible tube 80 for supplying fuel to the engine and which communicates with the regulator 70 via a nozzle 81 engaged unitarily to the can 52. Because flange 24 of the present invention does not carry or support the fuel delivery module 16, other components are easily supported by the flange 24. These components include, but are not limited to, an on-board diagnostic-two pressure transducer, OBD2, for detecting fuel tank leakage via pressure differential, and a fill limit vent valve, FLVV.

Figure 9:
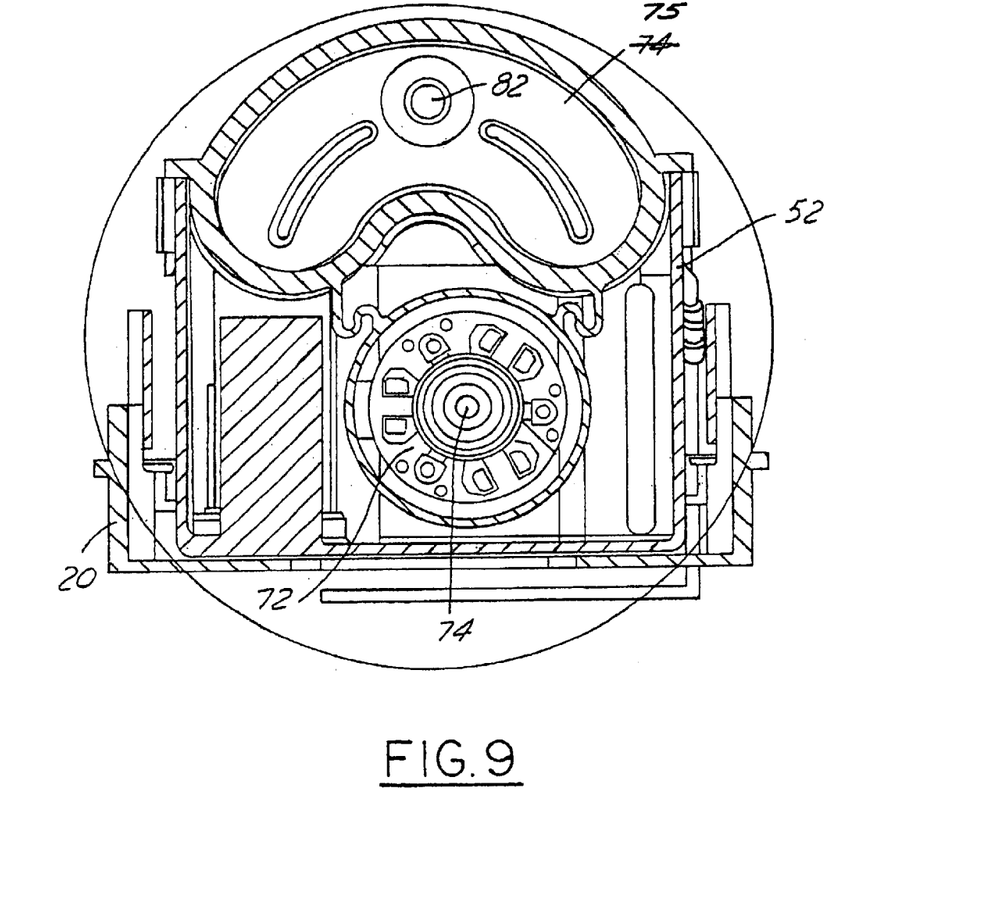
FIG. 9 is a section view of the fuel delivery module and bracket taken along line 9—9 of FIG. 3.
Figure 9A:
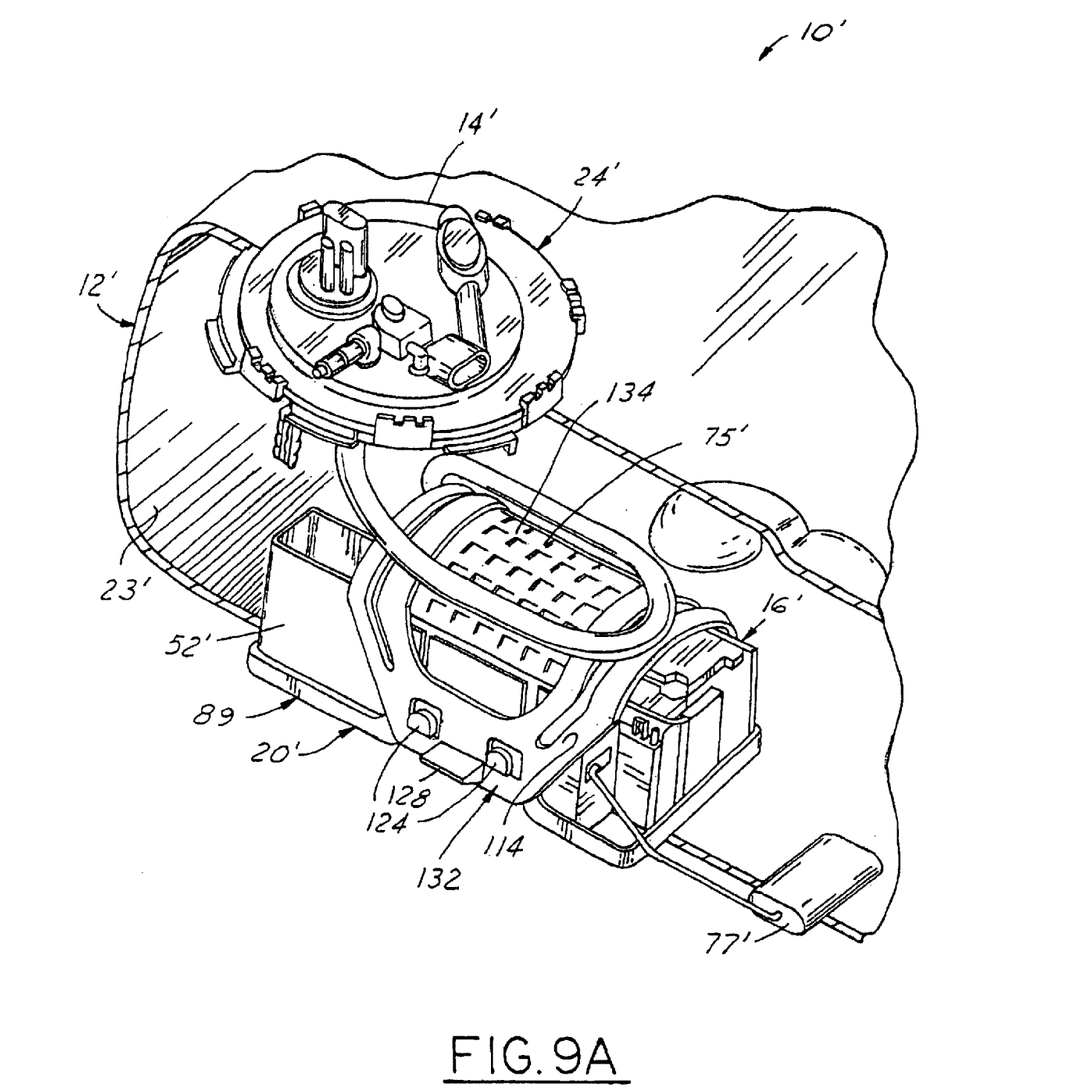
FIG. 9A is a perspective view of a second embodiment of a fuel delivery module, bracket and tank assembly with part of the fuel tank broken away and in section to show internal detail.
Figure 9B:
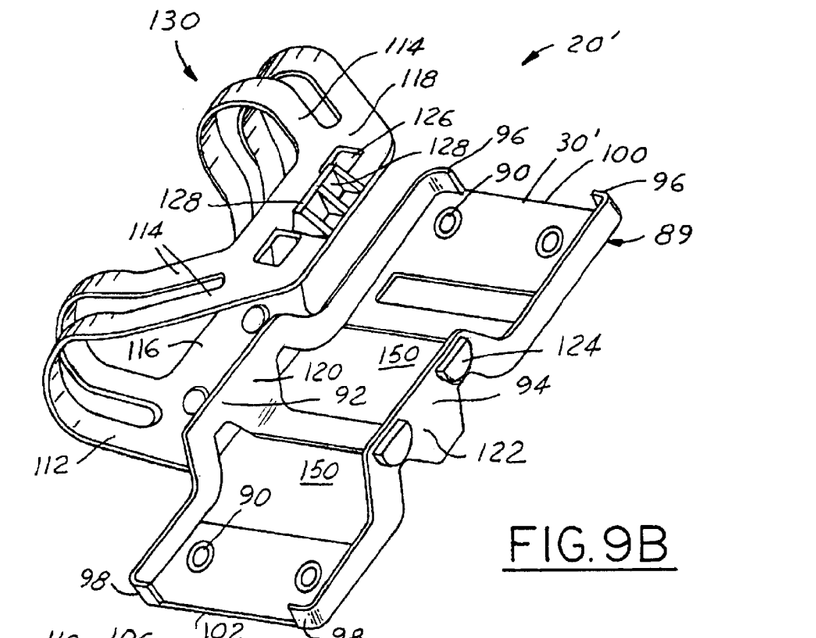
FIG. 9B is a perspective view of the second embodiment of the bracket illustrated in an open position.
Figure 9C:
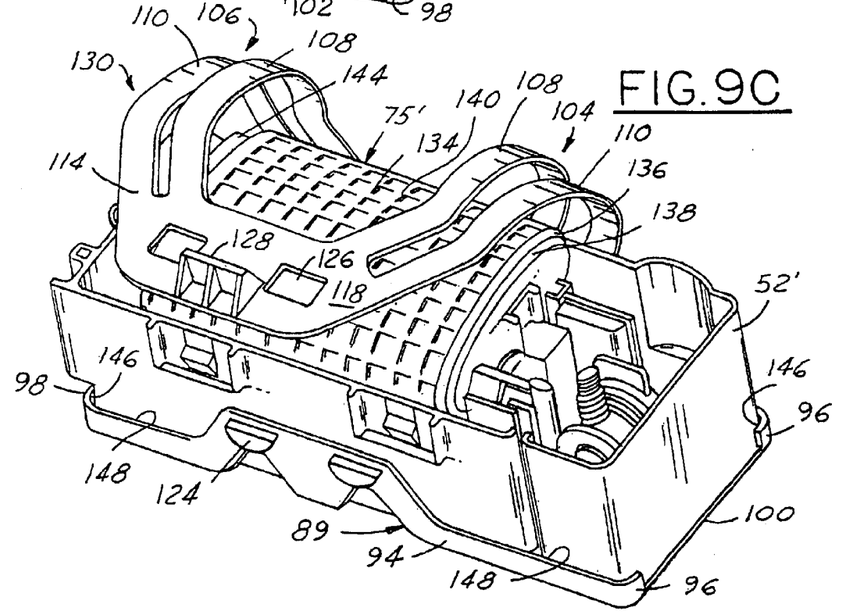
FIG. 9C is a perspective view of the second embodiment with the fuel delivery module placed within the bracket and the bracket illustrated in an open position.

Referring to FIGS. 9A–9C, a second embodiment of a fuel delivery assembly 10' is useful in absorbing shock, or G-forces, therefore relieving stress placed upon the tank to bracket interface and the fuel module to bracket interface. The strapped bracket 20' allows the fuel delivery module 16' to move slightly in any direction which acts to decelerate the module over a longer time period than the stiffer first embodiment during high impact scenarios.

Laser welds 90, which require no special tank features or contours, secure a substantially planar base plate 30' of a base unit or tray 89 of the bracket 20' to the inner surface 23' of the fuel tank 12'. There are four welds 90 illustrated in FIG. 9B, however, there may be more or less depending upon the weight of the fuel delivery module 16' and the configuration of the fuel tank assembly 10'. The tray 89 is preferably made of like material to the inner surface 23' of the fuel tank 12'. As one example, if the fuel tank is HDPE, preferably, the tray 89 is also made of HDPE to enhance the strength of the weld. However, because HDPE has a tendency to swell when soaked with hydrocarbon fuel, the tray 89 should also be reinforced with integral glass fibers to reduce swelling. The laser weld 90 is preferred over plate welding because the tray 89 is designed to flex and is too thin to handle the high heat produced during the plate welding process. Laser welding is also advantageous because the laser weld equipment permits off-setting the bracket 20' away from the tank access hole 14'. This off-set can generally be as great as six to twelve inches for a typical automotive fuel tank application. Fiber optics are used to locate the weld between the bracket 20' and the tank 12'. When utilizing a laser light wavelength of approximately 800 nm, the welding process takes about three to five seconds.

Initially locating the fuel delivery module 16' to the bracket 20' are first and second side guide plates or side curbs 92, 94 of the tray 89 which substantially oppose one-another, performing similarly to the guide plates 68 of the first embodiment. The side curbs 92, 94 project substantially upward from respective longitudinal edges of the base plate 30', and extend longitudinally of the base plate 30' between forward and rearward stop tabs 96, 98 of the tray 89. The forward stop tabs 96 function similarly to the stop tab 40 of the first embodiment, limiting forward movement of the fuel delivery module 16' within the bracket 20'. The forward stop tabs 96 extend inward toward one-another from respective ends of the curbs 92, 94 and along a minor portion of a lateral or forward edge 100 of the base plate 30'. The additional rearward stop tabs 98 of the second embodiment limit rearward movement of the fuel delivery module 16' within the bracket 20', and extend inward toward one-another along a minor portion of a rearward edge 102 of the base plate 30' from respective ends of curbs 92, 94.

After the base plate 30' of the tray 89 is laser welded to the tank 12', an elongated support structure or can 52' of the elongated fuel delivery module 16' is placed into the tray 89 from a substantially vertical direction. The forward and rearward stop tabs 96, 98 align the can 52' longitudinally to the tray 89, and the first and second curbs 92, 94 align the can 52' laterally to the tray 89.

A resilient forward and rearward pair of straps 104, 106, secure the module 16' resiliently and directly against the welded base plate 30'. Each pair of straps 104, 106 has a long mid strap 108 and a shorter end strap 110 which extend snugly and resiliently over a contoured fuel filter 75' of the module 16' engaged to the can 52'. Preferably, opposite ends 112, 114 of the straps 108, 110 of both pairs extend between and are engaged unitarily to a first and a second flap 116, 118. The first flap 116 is illustrated as being hinged unitarily to a raised portion 120 of the first curb 92 along an axis disposed longitudinally of the base plate 30'. The second flap 118 snap locks to a raised portion 122 of the second curb 94 via a snap locking feature, or two respective apertures 126 communicating through the second flap 118 which snugly receive two protuberances 124 projecting outward from the second raised portion 122. A thumb catch 128 projects outward from the second flap 118 between the apertures 126 to assist the user in snap locking the second flap 118 and straps 108, 110 from an open position 130 to a closed or locked position 132.

Because the bracket 20' is illustrated as one unitary part, the straps 108, 110 are made of the same material as the base plate 30' which is preferably HDPE. The straps must be thin enough to enable stretching across the fuel filter 75' thus providing a degree of give or resilience. The thickness of the strap necessary to achieve this resilience is thus dependent upon the material used.

Alternatively, the straps 108, 110 and the flaps 116, 118 can be unitary with each other, yet separate as a single molded unit from the base plate 30'. With this configuration, the first flap 116 has a snap locking feature instead of the resilient hinge. As a separate entity, the straps and flaps can be made of a material with excellent elastic properties yet different than the material of the base plate 30' which must be similar to the tank 12' material for welding purposes. One such material for the straps and flaps is nylon.

As presently illustrated, the fuel filter 75' of the fuel delivery module 16' is supported by and protrudes upward from the can 52'. A substantially outward facing contoured surface 134 of the filter 75' disposed above the can 52' is in direct contact with the resilient straps 108, 110. The contoured surface 134 has a forward shelf or shoulder 136 which substantially lies within an imaginary plane disposed perpendicular to the base plate 30'. The forward shelf 136 is contiguously defined between and disposed substantially perpendicular to a leading proximal portion 138 of the contoured surface 134 and a distal mid portion 140. The short strap 110 of the forward pair 104 is resiliently engaged directly to the leading proximal portion 138 of the contoured surface 134. The longer mid strap 108 of the forward pair is directly engaged resiliently to the distal mid portion 140 disposed generally further away from the base plate 30' than the forward proximal portion 138. During high impact scenarios, the forward shelf 136 will contact the short strap 110 of the forward pair 104 thereby limiting the forward movement of the fuel delivery module 16' within the bracket 20'.

Likewise, the contoured surface 134 of the fuel filter 75' has a rearward shelf 142 which lies within an imaginary plane disposed substantially parallel to the forward shelf 136. The rearward shelf 142 is defined contiguously between and disposed substantially perpendicular to a trailing proximal portion 144 of the contoured surface 134 and the distal mid portion 140. The short strap 110 of the rearward pair 106 is resiliently engaged directly to the trailing proximal portion 144 of the contoured surface 134. The longer mid strap 108 of the rearward pair 106 and the longer mid strap 108 is directly engaged resiliently to the distal mid portion 140. During high impact scenarios, the rearward shelf 142 will contact the stretchable short strap 110 of the rearward pair 106 thereby limiting the rearward movement of the fuel delivery module 16' within the bracket 20'. Depending upon dynamics of the environment and the shape and weight distribution of the fuel delivery module 20' other strap configurations can also suffice. For instance, one short strap may secure the module by engaging the filter's contoured surface from within a channel defined by the surface 134.

Referring to FIG. 9C, movement of the fuel delivery module 16' with respect to the base plate 30' and the laser welds 90 is limited to about two millimeters for a typical automotive fuel tank application. With the fuel delivery module 16' centered longitudinally to the base plate 30' by the tight relationship between the short straps 110 and the forward and rearward shelves 136, 142, a clearance 146 of approximately two millimeters exists between can 52' and the forward tabs 96, and the can 52' and the rearward tabs 98. To assist in similar, but lateral movement, a clearance 148 of approximately two millimeters exists between the can 52' and the first curb 92, and the can 52' and the second curb 94 of the base plate 30' when in an un-flexed state. Of course with the second flap 118 snap locked to the raised portion 122, the clearance 148 is effectively eliminated at the raised portion 120, 122 junctures.

Also to assist in flexing of the tray 89, two cut-outs 150 communicate through and extend laterally across the base plate 30' and partially upward communicating through each side curb 92, 94, but stopping short of the raised portions 120, 122.

While the forms of the invention herein disclose constitute a presently preferred embodiment, many others are possible. For instance, the opposing clasps 26 can be replaced with a strap which wraps around the module 16 and engages the base plate of the alternative bracket at either end. It is not intended herein to mention all the equivalent forms or ramifications of the invention, it is understood that the terms used herein are merely descriptive rather than limiting and that various changes may be made without departing from the spirit or scope of the invention.

We claim:

1. A fuel tank assembly comprising:
   a fuel tank having an inner surface defining a fuel chamber;
   a bracket permanently attached to the inner surface;
   a fuel delivery module having a support structure engaged to the bracket, a fuel pump and an electric motor for operating the pump, wherein the pump and the electric motor are carried and supported by the support structure and the fuel delivery module is secured to the bracket within the fuel chamber; and
   wherein the fuel pump motor has a rotational axis positioned substantially horizontal.

2. The fuel tank assembly set forth in claim 1 comprising:
   a base plate of the bracket disposed between the inner surface and the fuel delivery module; and
   a weld for securing the base plate to the inner surface.

3. The fuel tank assembly set forth in claim 2 comprising:
   a tray of the bracket having the base plate and two longitudinal side curbs projecting outward from the base plate and away from the inner surface; and
   wherein the fuel delivery module is disposed between the two side curbs.

4. The fuel tank assembly set forth in claim 3 comprising:
   a forward end tab projecting away from the inner surface and outward from a forward edge of the base plate extending between the two curbs; and
   wherein the fuel delivery module is disposed rearward of the forward end tab and is limited in forward movement by the forward end tab.

5. The fuel tank assembly set forth in claim 4 comprising:
   a rearward end tab projecting away from the inner surface and outward from rearward edge of the base plate extending between the two curbs; and
   wherein the fuel delivery module is disposed forward of the rearward end tab and is limited in rearward movement by the rearward end tab.

6. The fuel tank assembly set forth in claim 5 comprising:
   a clearance disposed between the fuel delivery module and the forward end tab;
   a clearance disposed between the fuel delivery module and the rearward end tab; and
   a clearance disposed between the fuel delivery module and each one of the two curbs.

7. The fuel tank assembly set forth in claim 1 comprising:
   a tray of the bracket, the fuel delivery module disposed in the tray;
   a weld disposed between and securing the tray to the inner surface of the fuel tank; and
   a resilient strap of the bracket having first and second ends engaged to the tray, wherein the strap is in resilient contact with the fuel delivery module disposed between the strap and the tray.

8. The fuel tank assembly set forth in claim 3 comprising:
a resilient strap of the bracket having a first end engaged to the first curb and an opposite second end engaged to the second curb of the tray; and
wherein the strap is in resilient contact with and about the fuel delivery module which is disposed between the tray and the strap.

9. The fuel tank assembly set forth in claim 8 wherein the first end of the strap is engaged unitarily to the first curb and the second end is snap locked to the second curb of the tray.

10. The fuel tank assembly set forth in claim 8 wherein the first and second ends of the strap are snap locked to the respective first and second curbs of the tray.

11. The fuel tank assembly set forth in claim 8 comprising:
the fuel delivery module having an outward facing contoured surface having a shelf lying within an imaginary plane disposed substantially perpendicular to the base plate; and
wherein the resilient strap is in resilient contact with the shelf thereby limiting movement of the fuel delivery module longitudinally of the tray.

12. The fuel tank assembly set forth in claim 11 comprising:
a leading proximal portion of the contoured surface;
a distal mid portion of the contoured surface disposed rearward of the leading proximal portion;
wherein the distal portion projects further away from the tray than the leading proximal portion and the shelf is defined between the distal and proximal portions; and
wherein the strap is in resilient contact with the leading proximal portion thereby limiting forward axial movement of the fuel delivery module.

13. The fuel tank assembly set forth in claim 12 comprising:
the contoured surface having an axial trailing proximal portion disposed axially rearward of the distal portion, wherein the distal portion projects further away from the tray than the trailing proximal portion; and
the bracket having a resilient rearward strap and a resilient forward strap, wherein the resilient forward strap is the resilient strap, and wherein the rearward strap is in resilient contact with the trailing proximal portion thereby limiting rearward movement of the fuel delivery module.

14. The fuel tank assembly set forth in claim 13 wherein the bracket sub-assembly has a resilient mid strap which is longer than the rearward and forward end straps and is in resilient contact with the distal mid portion of the contoured surface to limit movement of the fuel delivery module with respect to the bracket.

15. The fuel tank assembly set forth in claim 14 wherein the second ends of the forward, rearward and mid straps unitarily engage a flap being snap locked to the second curb.

16. The fuel tank assembly set forth in claim 7 wherein the inner surface of the fuel tank and the tray are high density polyethylene.

17. The fuel tank assembly set forth in claim 16 wherein the tray is reinforced by glass fiber.

18. The fuel tank assembly set forth in claim 17 wherein the strap is unitary to the tray and is made of glass reinforced high density polyethylene.

19. The fuel tank assembly set forth in claim 16 wherein the strap is made of nylon.

20. A fuel tank assembly comprising:
a fuel tank having an inner surface defining a fuel chamber; and
a fuel delivery module having a support structure engaged to the inner surface, a fuel filter, a fuel pump and an electric motor for operating the pump, wherein the motor has a rotational axis positioned substantially horizontal, and wherein the fuel filter, the fuel pump and the electric motor are carried and supported by the support structure.

21. The fuel tank assembly set forth in claim 20 wherein the support structure is a can, the can defining a fuel reservoir and the fuel pump being disposed within the can.

22. The fuel tank assembly set forth in claim 20 wherein the fuel delivery module has a fuel supply pressure control assembly supported by the support structure.

23. The fuel tank assembly set forth in claim 21 further comprising two opposing clasps projecting into the fuel chamber from the inner surface of the fuel tank, the support structure of the fuel delivery module being engaged between the two opposing clasps.

24. The fuel tank assembly set forth in claim 23 further comprising an elongated bracket engaged rigidly to the inner surface of the fuel tank within the fuel chamber, the bracket having a base plate and the two opposing clasps engaged unitarily to and extending longitudinally lengthwise along the base plate.

25. The fuel tank assembly set forth in claim 24 further comprising:
the clasp having a wall and a cross bar, the wall extended between the base plate and the cross bar, the wall projecting into the fuel chamber, the cross bar projecting outward from the wall over and spaced from the base plate; and
the support structure of the fuel delivery module having opposite longitudinal sides and spacer bars projecting outward from each respective one of the sides, and engaged to the respective cross bar of the bracket preventing movement of the fuel delivery module with respect to the bracket away from the inner surface.

26. The fuel tank assembly set forth in claim 25 further comprising:
the support structure having a snap clip; and
the bracket having a locking tab, the snap clip being locked to the locking tab preventing rearward movement of the fuel delivery module with respect to the bracket.

27. The fuel tank assembly set forth in claim 26 further comprising:
the snap clip having a base, a cantilevered arm and a lip, the base engaged between one of the longitudinal sides of the support structure and the cantilevered arm, the cantilevered arm disposed parallel to and extended co-longitudinally along the side, the lip engaged to a distal end of the cantilevered arm and projected laterally with respect to the side of the support structure; and
the locking tab having a contact surface facing forward, the lip being in contact with the contact face preventing rearward movement of the fuel delivery module.

28. The fuel tank assembly set forth in claim 27 wherein the locking tab projects into the fuel chamber away from the inner surface and from the cross bar of the clasp, and wherein the cantilevered arm projects forward along the side of the support structure from the base of the snap clip.

29. The fuel tank assembly set forth in claim 28 wherein the lip projects laterally outward with respect to the adjacent side, and wherein the cantilevered arm is disposed between the adjacent side and the locking tab of the clasp.

30. The fuel tank assembly set forth in claim 28 wherein the clasp has a guide member projecting rearward and angled laterally outward from the wall in the rearward direction.

31. The fuel tank assembly set forth in claim 26 further comprising:

the clasp having a guideway defining a channel;

the guideway of the clasp having an elongated rail disposed parallel to and projecting toward the base plate, the channel defined between the wall and the rail; and the support structure of the fuel delivery assembly having a slot and an elongated interlocking rail projecting transversely from the spacer bar, the slot defined between the interlocking rail and the side of the support structure, the elongated rail of the clasp disposed within the slot and the interlocking rail of the support structure being disposed within the channel.

32. The fuel tank assembly set forth in claim 31 further comprising:

the base plate of the bracket having a forward edge extending between the two opposite edges; and the bracket having a stop tab projecting unitarily from the base plate into the fuel chamber and contacting the support structure of the fuel delivery assembly preventing further forward movement of the fuel delivery assembly.

33. The fuel tank assembly set forth in claim 32 wherein the inner surface of the fuel tank has a bottom surface, the bracket being engaged to the bottom surface.

34. The fuel tank assembly set forth in claim 33 further comprising:

the fuel tank having an upper side and a flange, the upper side defining an access hole through which the fuel delivery module is inserted into the fuel tank, the flange engaged to the upper side and sealably covering the hole; and the fuel delivery module having a wiring harness and a fuel supply tube routed through the flange.

35. The fuel tank assembly set forth in claim 22 further comprising:

the fuel tank having an upper side and a flange, the upper side defining an access hole through which the fuel delivery module is inserted into the fuel tank, the flange engaged to the upper side and sealably covering the hole; and the fuel delivery module having a wiring harness and a fuel supply tube routed through the flange.

36. The fuel tank assembly set forth in claim 34 wherein the fuel tank is made of blow molded plastic and the bracket is made of injected plastic.

37. The fuel tank assembly set forth in claim 22 wherein the maximum height of the fuel tank is less than the longitudinal length of the fuel delivery module.

38. The fuel tank assembly set forth in claim 37 wherein the longitudinal length of the fuel delivery module is orientated at an angle of less than ten degrees from an imaginary horizontal plane.

39. A method of manufacturing a fuel tank assembly comprising the steps of:

blow molding a plastic fuel tank;

inserting a bracket into the fuel tank through a tank access hole;

welding the bracket to the fuel tank;

inserting a fuel delivery module into the fuel tank through the tank access hole; and snap locking the fuel delivery module to the bracket so that a longitudinal axis of the fuel delivery module is disposed substantially horizontally.

40. A fuel tank assembly comprising:

a fuel tank having an inner surface defining a fuel chamber;

a fuel delivery module disposed within the fuel chamber, the fuel delivery module having a fuel pump and an electric motor for operating the pump;

a bracket having a tray directly attached permanently to the inner surface of the fuel tank and a resilient strap having first and second ends engaged to the tray, wherein the fuel delivery module is disposed within the tray and between the tray and the strap; and wherein the strap is in tension when engaged to the fuel delivery module which is in compression via the strap.

41. The fuel tank assembly set forth in claim 1 wherein the fuel delivery module has a fuel supply pressure control assembly supported by the support structure.

42. The fuel tank assembly set forth in claim 38 wherein the filter is elongated having an axis disposed parallel to the axis of the fuel pump motor.

43. A fuel tank assembly comprising:

a fuel tank having an inner surface defining a fuel chamber, a bracket engaged to the inner surface; and a fuel delivery module having a can engaged to the bracket, a fuel pump motor having a rotational axis positioned substantially horizontal, a fuel filter, a fuel supply pressure control assembly, and a fuel level sensing assembly, wherein the fuel pump motor, the fuel filter, the fuel supply pressure control assembly, and the fuel level sensing assembly are carried and supported by the can.

44. The fuel tank assembly set forth in claim 21 wherein the fuel tank is made of blow molded plastic and the bracket is made of injected plastic.

45. A method of manufacturing a fuel tank assembly comprising the steps of:

inserting a fuel delivery module into a fuel tank through a tank access hole;

positioning the fuel delivery module horizontally along a bottom surface of the fuel tank;

aligning two opposite spacer bars of a can of the fuel delivery module below two respective opposing cross bars of respective clasps engaged to the bottom surface of the fuel tank;

sliding the fuel delivery module between the clasps wherein the spacer bars engage the respective cross bars; and snap locking the can to a locking tab of the bracket.

* * * * *